May 6, 1958  J. R. HECHT  2,833,633
APPARATUS FOR FORMING LOGS OF COMPRESSIBLE MATERIALS
Filed Jan. 10, 1955  3 Sheets-Sheet 1
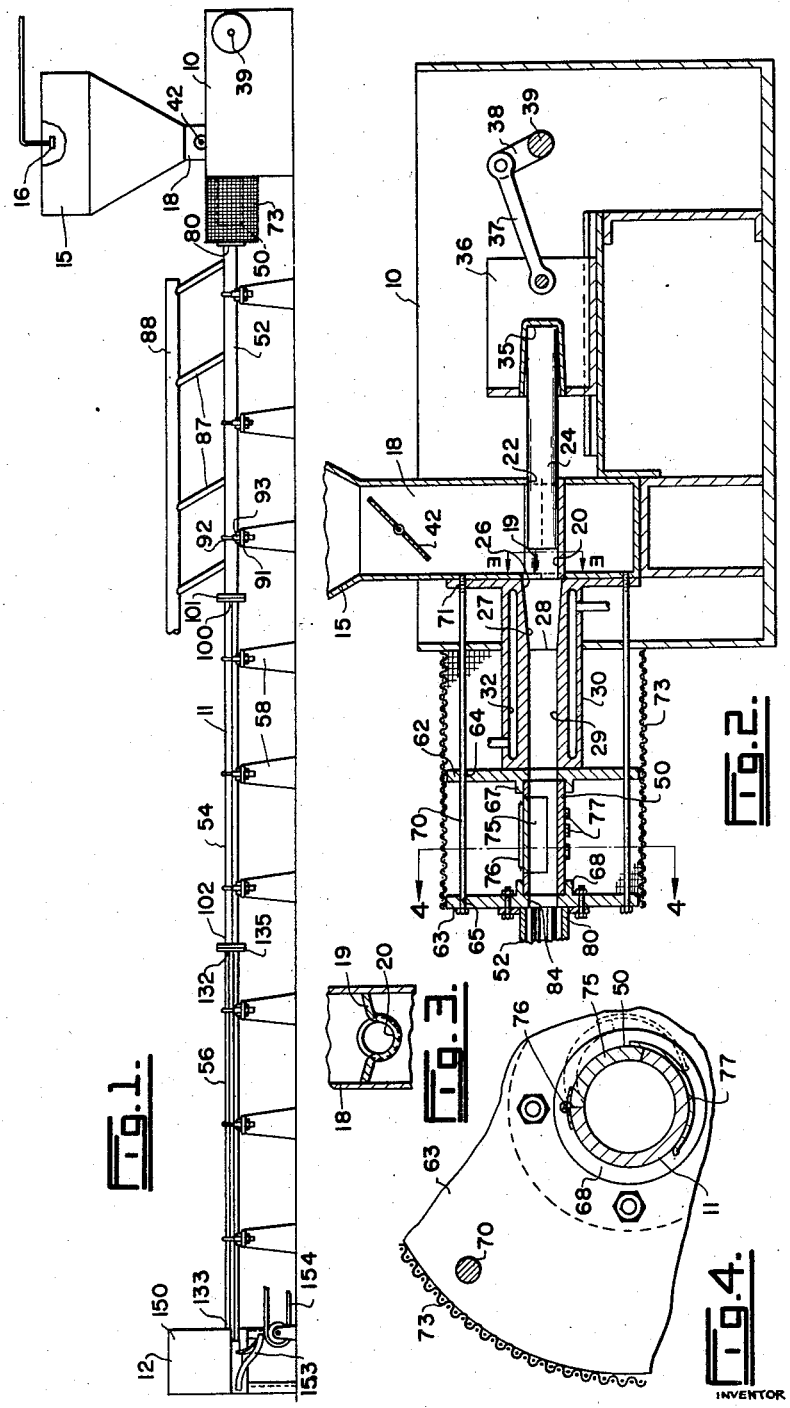
INVENTOR
JOHN R. HECHT
BY
Fetherstonhaugh & Co.
ATTORNEYS May 6, 1958         J. R. HECHT         2,833,633
APPARATUS FOR FORMING LOGS OF COMPRESSIBLE MATERIALS
Filed Jan. 10, 1955         3 Sheets-Sheet 2
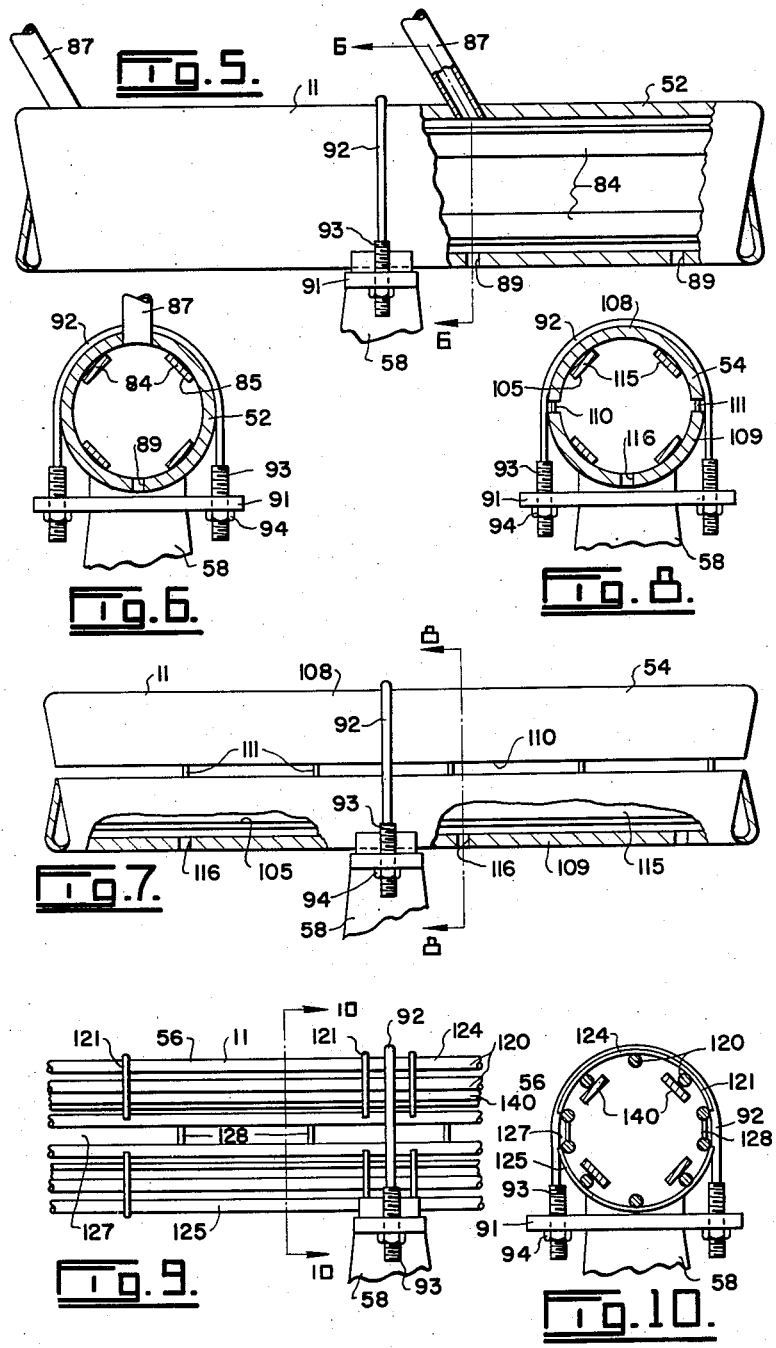
INVENTOR
JOHN R. HECHT
BY
Fetherstonhaugh & Co.
ATTORNEYS May 6, 1958 J. R. HECHT 2,833,633
APPARATUS FOR FORMING LOGS OF COMPRESSIBLE MATERIALS
Filed Jan. 10, 1955 3 Sheets-Sheet 3
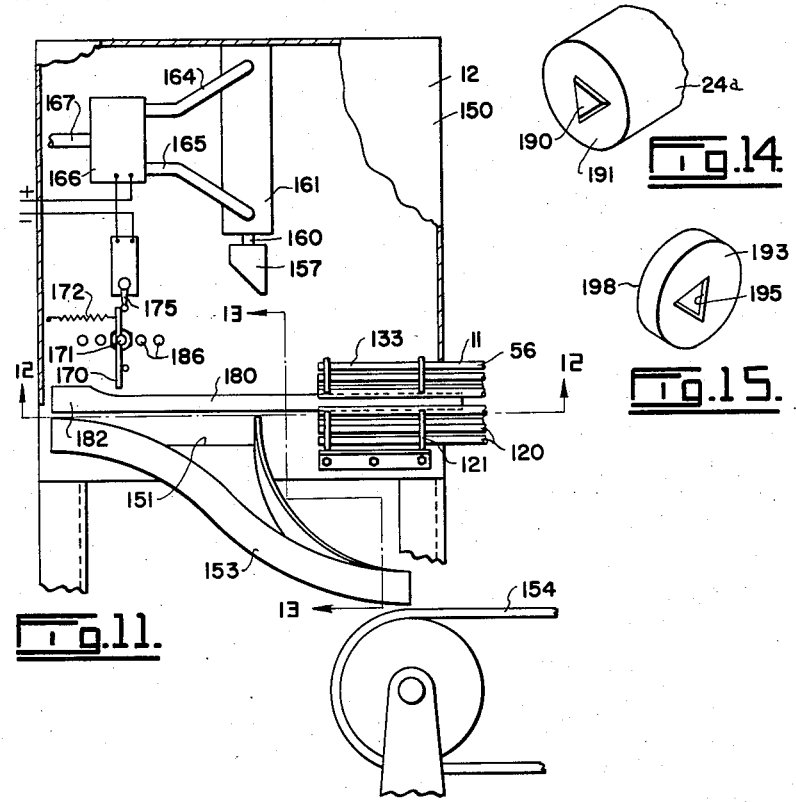
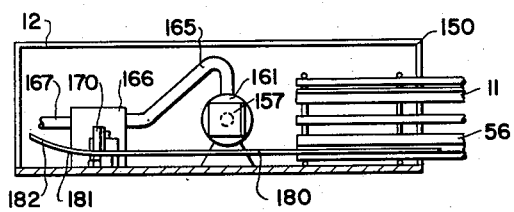
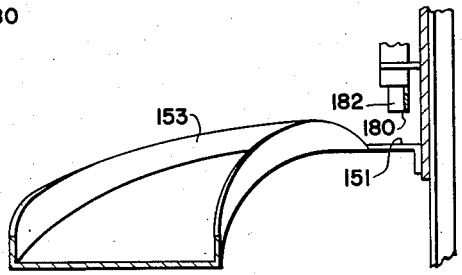
INVENTOR
JOHN R. HECHT
BY
Featherstonhaugh & Co.
ATTORNEYS United States Patent Office 2,833,633
Patented May 6, 1958

2,833,633

APPARATUS FOR FORMING LOGS OF COMPRESSIBLE MATERIALS

John R. Hecht, Vancouver, British Columbia, Canada

Application January 10, 1955, Serial No. 480,940

23 Claims. (Cl. 44—13)

This invention relates to apparatus for forming mainly sawdust into logs which may be burned in fireplaces, furnaces, boilers and the like, but which may be used for briquetting other suitable compressible materials, such as, for example, aluminum and steel shavings, wood shavings, bagasse, beet pulp, rice husks, peat moss, and the like, into substantially solid logs or units of any desired lengths.

An object of the present invention is the provision of apparatus for forming sawdust or other materials the bulk of which may be reduced by compression into a continuous log from which logs or units of any desired length may be broken.

Another object is the provision of apparatus in which compressed discs of sawdust or the like are pressed into a continuous log.

Another object is the provision of apparatus for forming sawdust logs which, when they are burned, tend to open up a little in order to admit air thereinto in order to aid combustion.

Another object is the provision of sawdust log or other unit forming apparatus utilizing high pressures and which includes means for automatically releasing the pressure if the latter increases beyond a predetermined point.

As this apparatus is designed primarily for sawdust, it is described in connection therewith, but it is to be understood that any other suitable and desired material, such as, for example, peat moss or other compressible material may be handled.

The present sawdust log or unit forming apparatus includes a long tube through which compressed sawdust or the like is moved. The tube includes means for resisting the movement of the sawdust therethrough, causing a back pressure therein to compress the sawdust into a continuous log. Suitable means is provided for cooling the continuous log, and this may be done by admitting cooling air to the tube. The back pressure in the tube is created by having the effective cross sectional area of the tube diminishing towards the outlet thereof.

The sawdust is moved through the tube in any convenient manner, but it is preferable to compress the sawdust into discs by means of a reciprocating plunger, and to use this plunger to move the discs one after the other on edge into and through the tube. Suitable means may be provided at the discharge end of the tube for breaking off predetermined lengths from the continuous log so that the logs are produced of a length which is convenient for handling and burning purposes. If the lengths of the logs or units does not matter, they may be allowed to break off from the main log by their own weight.

The tube employed in this apparatus is very long compared to its diameter. It is of the order of at least twenty times its diameter, and is preferably much longer than that.

An example of this invention is illustrated in the accompanying drawings, in which, Figure 1 is a diagrammatic side elevation of log or unit forming apparatus, Figure 2 is an enlarged vertical section through the part of the apparatus at the right end of Figure 1 in which sawdust or other material is compressed into discs, Figure 3 is a fragmentary sectional detail taken on the line 3—3 of Figure 2, Figure 4 is an enlarged fragmentary sectional view taken on the line 4—4 of Figure 2, Figure 5 is an enlarged side elevation, partly in section, of a portion of the tube indicated in Figure 1, Figure 6 is a cross section taken on the line 6—6 of Figure 5, Figure 7 is an enlarged side elevation, partly in section of another portion of the tube indicated in Figure 1, Figure 8 is a cross section taken on the line 8—8 of Figure 7, Figure 9 is another enlarged side elevation of a portion of the tube indicated in Figure 1, Figure 10 is a cross section taken on the line 10—10 of Figure 9, Figure 11 is an enlarged side elevation, partly in section of apparatus at the discharge end of the tube for breaking portions of log off the continuous log, Figure 12 is a horizontal section taken substantially on the line 12—12 of Figure 11, Figure 13 is a vertical section taken on the line 13—13 of Figure 11, Figure 14 is a perspective view of an end of an alternative form of plunger which may be used in this apparatus, and Figure 15 is a perspective view of a sawdust disc formed by use of the plunger of Figure 14.

Referring to Figure 1 of the drawings, 10 is a machine for forming compressed sawdust or the like discs of a desired thickness and diameter, 11 is a long horizontal tube in which the discs are compressed into a continuous log, said tube extending outwardly from the machine 10, and 12 is apparatus located at the discharge end of the tube for breaking the log into desired lengths or units. Actually, apparatus 12 may be omitted if the lengths of the finished products are of no consequence.

The actual construction and operation of the machine 10 does not form part of this invention. It does, however, form sawdust or other material into compressed discs, and it provides the motive power for moving the compressed material through the tube 11.

The machine 10 includes a large hopper 15 into which sawdust or the like, preferably in dry form, is fed. If desired, a spray 16 may be provided at the top of this hopper in order to be able to spray water on to the sawdust therein should said sawdust be too dry. This spray is connected to a source of water supply, not shown.

The hopper has a throat 18 extending downwardly therefrom, said throat having a wall 19 extending thereacross, see Figure 3, which actually slopes downwardly from its opposite sides to a central trough 20. This trough may have any cross sectional shape, but it preferably is substantially semi-circular in cross section. The trough communicates at one end with a circular opening 22 in the wall of the throat 18, through which a plunger 24 slidably extends into the trough. The shape of the plunger in cross section corresponds to that of the trough, and in this example it is circular. The opposite end of the trough communicates with the large end 26 of a tapered die 27, said die having a small outlet 28 communicating with a cylindrical passage 29 in a cooling head 30 of the machine. This head is formed with a chamber 32 therein surrounding the die 27 and passage 29, a suitable cooling medium, such as water being circulated through this chamber during operation of this machine.

The plunger 24 is reciprocated in the trough 20 in any desired manner. In this example, the outer end of the plunger fits in a pocket 35 of a slide 36, said slide being connected by a link 37 to a crank 38 on a shaft 39. The shaft extends out of the machine and is rotated by a suitable source of power, not shown.

If desired, a flap gate 42 may be provided in the throat 18 near the upper end thereof. This gate is in the form of a vane mounted on a shaft which extends outwardly through the throat wall and is rotated by a suitable source of power, not shown. As previously stated, the machine 10 was in existence prior to the present invention. When the plunger 24 moves along trough 20 away from the die 27, the trough fills with sawdust. When the plunger moves in the opposite direction, a predetermined quantity of sawdust is pressed into the die 26. As this die has a comparatively steep taper towards its outlet 28, the sawdust is compressed into a flat disc. This compression of the sawdust generates considerable heat which helps to make the particles of sawdust adhere to each other. As the plunger continues to reciprocate, it forms these discs and each one moves the discs ahead of it through passage 29 where they are cooled considerably by the cooling medium in the cooling head.

The tube 11 previously referred to is preferably, although not absolutely necessary, formed in successive sections. This tube may have any desired cross sectional shape, depending upon the shape required for the finished logs or units. In this example, however, the tube is circular in cross section. It includes a safety section 30 at its entrance end, a cooling section 52, a slotted compression section 54, and a cage compression section 56. The tube may be supported in any convenient manner, such as by a plurality of spaced pillars 58.

The internal diameter of the safety section 50 of tube 11 is aligned with and the same as the passage 29 of the cooling head of machine 10, see Figures 2 and 4. This section may be carried at its opposite ends by plates 62 and 63 having aligned holes 64 and 65, respectively, therein and spaced radially from the section tube. The plate 62 may be secured to the outer or discharge end of the cooling head 30 in any desired manner, such as by welding. The opposite ends of the safety section tube removably fit into sockets 67 and 68 in plates 62 and 63, and the latter plate is held in position by a plurality of long bolts 70 which extend through the holes 64 and 65 of the plates and are threaded into a portion of the machine 10 at 71. If desired, a cylindrical screen 73 may extend around the safety section 50, said screen being spaced outwardly therefrom by the plates 62 and 63.

The safety section 50 is provided with a door 75 movably mounted therein. This door may be mounted along one edge thereof on the main portion of the safety section tube by a hinge 76. The opposite edge of the door is removably held in position by a plurality of comparatively heavy spring clips 77 which extend around a portion of the outer surface of the section tube, see Figure 4.

The door 75 of the safety section is normally held in the closed position by the clips 77. These clips are designed to hold the door closed against considerable pressure. However, if this pressure reaches a predetermined point, the clips are no longer able to hold the door closed so that the latter flies open to relieve the pressure. The sawdust in the safety section usually flies out of it when this takes place, but the screen 72 confines it so that it does not cause any damage or harm.

The cooling section 52 of tube 11 may have a slightly tapered bore so that it diminishes in cross section from the end or entrance 80 thereof connected to the safety section 50, but it is preferable not to taper it, as shown in the drawings. A plurality of spaced guides 84 are secured to the inner wall of the cooling section tube and extend the length thereof, said guides being arranged around the axis of the tube. These guides are shown in Figures 5 and 6. They may be in the form of flat bars, as shown, secured to the inner wall of the tube section. These guides reduce the bore of the tube through which the sawdust discs are moved. Therefore, when the guides are used, the actual inside diameter of the tube section is larger than that of the safety section 50, see left end of Figure 2. In other words, the effective inside diameter of the cooling section (created by the guides 84) is the same as that of the safety section. The guides provide spaces 85 therebetween. Suitable means is provided for directing cooling air into the spaces 85 within the cooling tube section 52. For this purpose, one or more pipes 87 open into the section. There are preferably several of these pipes located at different points along the length of the cooling section, but these pipes may extend to a common cylinder or pipe 88 which extends to a source of air supply, not shown. Cooling air is directed by the pipes 87 into the spaces between the guides 84 to help cool the discs as they move through this pipe section.

As some particles of sawdust usually fall away from the discs, a plurality of holes 89 may be formed in the bottom of the section tube through which any such particles may drop out of the section.

The tube section 52 is mounted on the pillars 58 and secured thereto in any convenient manner. In this example, each pillar is provided with an anchor plate 91, and a U-shaped bolt or strap 92 extends over the pipe section, said bolt or strap having enlarged threaded ends 93 which slidably extend through the anchor plate and have nuts 94 threaded thereon. These nuts are tightened against the anchor plate to secure the tube section in position on the pillar.

The slotted compression section 54 of the tube 11 has an effective bore 105 which diminishes slightly in cross sectional area from the entrance end 100 thereof which is connected by a suitable coupling 101 to the discharge end of the cooling section 52, to its own discharge end 102. This compression section is formed in two longitudinal halves 108 and 109 which are spaced from each other to form slots 110 on opposite sides of the tube extending longitudinally of the section, see Figures 7 and 8. In order to be sure that the two halves stay apart at all times, a plurality of spacing pins 111 may be connected to one half and extend towards the other. The U-bolt 92 at each pillar 58 holds the two halves together and the section in place on the pillars. The inside diameter of the section may be adjusted by turning the nuts 94 to loosen or tighten the U-bolts on the section. For example, the U-bolts may be loosened at the entrance end of the section while those near the discharge end thereof may be tightened, or vice versa. In this way, the effective bore 105 may be tapered from the entrance end 100 to the discharge end 102 without tapering the actual bore of the tube halves, although the halves may be so constructed that the actual bore thereof tapers as well.

Section 54 of the tube is preferably provided with a plurality of spaced guides 115 along its inner surface extending from end to end thereof. Figure 8 shows two of these guides in each of the halves 108 and 109. Here again, the guides form the effective inner diameter of the section tube, and this diameter is just large enough to accommodate the sawdust discs on edge. It is preferable to construct a tube section and its guides so that when the discs are moving therethrough, the two halves 108 and 109 are completely free from each other. That is, the pins 111 do not extend from one half to the other. This makes it possible then to adjust the effective inner diameter of the section within limits by adjusting the U-bolts 92.

If desired, a plurality of holes 116 may be formed in the bottom of the section 54 in order to permit particles of sawdust which are scraped off the discs to drop out of the section.

The slots 110 on opposite sides of section 54 permit air to enter the section, and said air circulates through the spaces between the guides 115 to help cool the discs moving through the section, said discs being further compressed as they move through the section owing to the tapered effective bore of the latter.

When tube section 52 has been shown in one piece, it is obvious that it may be made in two spaced halves in the same manner as section 54, in which case the effective bore of the former section may be tapered and adjusted by means of the U-bolts 92.

Cage compression section 56 is similar to section 54 with the exception that it is so constructed that there are more longitudinal slots therein for cooling purposes. Section 56 is formed of a plurality of spaced rods 120 extending longitudinally of the section secured to the inside of a plurality of spaced rings 121. In order to be able to adjust this section, it is preferable to form it in two halves 124 and 125 which are actually spaced from each other. For this purpose, each ring 121 is also split into two halves, as clearly shown in Figure 9. The two halves are spaced from each other to form slots 127 in opposite sides of the section, and limiting pins 128 are provided so that the sections are kept apart at all times. U-bolts 92 secure the section to the pillars 58 and make it possible to adjust the halves relative to each other in order to taper the effective bore of the section.

The two halves of section 56 are preferably so adjusted that the inner cross sectional area of said section diminishes from the inlet end 132 of the section to the outlet end 133 thereof, end 132 being connected to the outlet end 102 of section 54 by a suitable coupling 135. The rods 120 may be made to converge towards the outlet end, but this is not necessary.

Section 56 is preferably formed with a plurality of spaced guides 140 which form the effective bore of the section. This bore converges towards the outlet end of the section. With this arrangement, air enters the section between the rods 120 and circulates around the sawdust discs moving through said section on the guides 140.

The halves 124 and 125 of section 56 are preferably well clear of each other when the sawdust discs are moving through the section. This makes it possible to adjust the taper of the effective bore by means of the U-bolts 92.

The outlet end 133 of the cage compression section of tube 11 extends into the apparatus 12 for breaking the sawdust log into desired lengths. This apparatus includes a casing 150 over a table 151, see Figures 11 to 13. The tube section extends over this table, and the latter has a discharge chute 153 extending laterally and downwardly therefrom. The log enters this chute in almost a lateral direction, and the chute is designed to turn the log so that it is moving longitudinally of its axis when it leaves said chute. The chute may discharge on to a suitable conveyor 154.

A dull guillotine blade 157 is suspended above the outlet end 133 of the last section of the tube and just beyond said end. The blade preferably lies in a plane extending at right angles to the axis of the tube section. Suitable means is provided for moving the blade downwardly to strike the portion of the sawdust log projecting from the tube.

In this example, the guillotine blade is mounted on the lower end of a piston rod 160 which is connected to a piston inside a pneumatic or hydraulic cylinder 161. Fluid is supplied to and directed from opposite sides of the piston in the cylinder by pipes 164 and 165 extending from a control valve 166. Fluid under pressure is directed to this valve through pipe 167 from a suitable source, not shown. The construction and operation of valves of this type are well known in the art and do not need to be described herein. It is sufficient to say that the valve may be operated to move the piston in the cylinder 161 up and down, as desired. This valve may be electrically controlled.

A trigger plate 170 is hingedly mounted at 171 and normally extends downwardly into the path of the continuous sawdust log moving out of tube 11 at a predetermined distance from the outlet of said tube. If desired, a spring 172 may be provided for normally retaining this plate in a vertical position. When the lower end of the plate is swung out of its vertical position by the sawdust log, the upper end of said plate operates a switch 175 which is electrically connected to valve 166. The arrangement is such that when this switch is operated, the piston in cylinder 161 is moved downwardly to move the guillotine blade in the same direction to strike the continuous log at a point near the outlet end of tube 11. This tends to fracture the log at the point where it is struck.

A guide bar 180 extends along the side of the log projecting from tube 11, and is bent laterally at 181 to form a deflector 182 extending towards the discharge chute 153. The curved portion of the guide bar is on the side of plate 170 remote from tube 11. With this arrangement, the sawdust log first swings plate 170 to cause blade 157 to be moved downwardly. As the log is moving continuously, its forward end is directed laterally by the curved deflector 182 of the guide bar. This causes a portion or section of the log to break off from the main portion thereof at the point where it was struck by the guillotine blade. After the forward end of the broken portion of the log is shifted laterally a short distance, said forward end drops down into the chute 153 and is directed on to the conveyor 154, the longitudinal axis of this log portion extending in the direction of movement of the conveyor.

As soon as the log drops into the discharge chute, plate 170 swings back to its normal vertical position, at which time the guillotine blade is raised to its normal position where it remains until the continuous sawdust log has moved forwardly sufficiently to swing plate 170 again.

As pointed out above, the sections 52, 54 and 56 of tube 11 are preferably provided with internal spaced guides 84, 115 and 140, respectively. These guides are aligned with each other so that in effect there are guides extending from one end to the other of the tube. The guides in section 52 are parallel to each other, although they may converge, while those of each of the sections 54 and 56 gradually converge so that the movement of the sawdust discs therethrough is resistant in order to create considerable back pressure in the tube. This results in the discs being so firmly pressed together that they will stand a great deal of knocking about without coming apart. It has been found that when a log is burning in a fire, there is a tendency for the discs to open slightly, thus admitting air into the interior of the log. This results in more flame and heat than would otherwise be generated. It is possible, however, to press the sawdust discs so firmly together that there is little or no tendency for them to open up in this manner. This results in less flame and heat, but the log burns longer.

The operation of this apparatus is simple, and requires very little attention. Compressed sawdust discs are formed in the machine 10, and these are moved one after the other on edge into one end of tube 11. Although the safety section 50 at this end of the tube may be omitted, it is preferable to have such a section for safety purposes since the back pressure in the tube is very great. Should this back pressure go beyond a predetermined point, door 75 will fly open to relieve the pressure, and screen 73 prevents the sawdust from flying away from the machine. As the discs move through the pipe section 52, the cooling air from pipes 87 is circulated around them in order to lower the temperature thereof.

As said discs progress through the tube sections 54 and 56, the resistance to their movement is progressively increased, and this tends to raise the temperatures thereof again. However, air enters the slots 110 in section 54 and the spaces between the rods 120 in section 56 to cool the discs. Thus, it will be seen that the compressed sawdust is formed into a continuous log in tube 11. After a predetermined length of this log has emerged from the outlet of the tube, the guillotine blade is driven downwardly to fracture the log at a point therebeneath. Continuous movement of the log forces the outer end thereof to swing laterally so that a predetermined length is broken off the main portion of the log. The length of the log broken off each time may be adjusted by shifting the hanging plate 170 longitudinally relative to the emerging log. A plurality of holes 186 are provided in casing 150 for receiving the pivot pin 171 of the plate. If it is found that the emerging log is not solid enough, some of the U-bolts 92 towards the outlet ends of sections 54 and 56 may be tightened further to increase the resistance to the movement of the log through tube 11. On the other hand, if it is found that the machine 10 is labouring owing to too great a resistance to the movement of the log, some of said U-bolts may be loosened until the labouring stops.

If the breaking apparatus 12 is omitted, the end of the continuous log is left unsupported as it emerges from the discharge end of tube 11. Pieces break off this log under their own weight, and these pieces are fairly uniform in length. However, if it is desirable to have all the log pieces substantially the same length, the breaking apparatus is employed.

If desired, one end of each disc formed in machine 10 may be embossed or indented in order to help the discs adhere together. Figures 14 and 15 illustrate one way of doing this.

A plunger 24a for machine 10 is provided with a fairly large boss 190 of any desired shape on its working end 191. Each time this plunger presses a quantity of sawdust into die 26, a disc 193 is formed having an indentation 195 in the end or face 196 thereof engaged by the plunger end. When the next disc is formed, the end or face 198 thereof is pressed against the end 196 of the preceding disc, resulting in the material of the second disc being pressed into the indentation 195 of the first disc. This helps to find the discs together.

What I claim as my invention is:

1. In apparatus for forming logs of compressible materials, such as sawdust, a long tube through which compressed material is moved, means in the tube for resisting the movement of the material therethrough and creating a back pressure therein to compress said material into a continuous log, and means for directing large quantities of cooling air to the tube suddenly to cool the compressed material, said sudden cooling increasing the binding effect of the compressed material.

2. In apparatus for forming logs of compressible materials, such as sawdust, a long tube through which compressed material is moved, means in the tube for resisting the movement of the material therethrough and creating a back pressure therein to compress said material into a continuous log, means for directing large quantities of cooling air to the tube at the beginning thereof suddenly to cool the compressed material, and means for admitting additional cooling air to the tube throughout the remainder of the length thereof.

3. In apparatus for forming logs of compressible materials, such as sawdust, a long horizontal tube through which compressible material is moved, means in the tube for resisting the movement of the material therethrough and creating a back pressure therein to compress said material into a continuous log, means for admitting large quantities of cooling air to the tube throughout a substantial portion thereof suddenly to cool the compressed material, and a plurality of holes in the bottom of the tube through which particles of material may fall.

4. In apparatus for forming logs of compressible materials, such as sawdust, a long tube, means for directly compressed material discs one after the other on edge into one end of the tube and moving said discs along the latter, means in the tube for resisting the movement of the discs therethrough and creating a back pressure therein to compress said discs into a continuous log, and means for directing large quantities of cooling air into the tube suddenly to cool the compressed material, said sudden cooling increasing the binding effect of the compressed material.

5. In apparatus for forming logs of compressible materials, such as sawdust, a long tube, a plurality of spaced guides extending longitudinally of the tube arranged around the axis thereof, means for directing compressed material discs one after the other on edge into one end of the tube and moving said discs along the guides of the latter, said discs fitting snugly within the guides, means in the tube for resisting the movement of the discs therethrough and creating a back pressure therein to compress said discs into a continuous log, and means for admitting large quantities of cooling air into the tube around the guides and log therein suddenly to cool the compressed material, said sudden cooling increasing the binding effect of the compressed material.

6. In apparatus for forming logs of compressible materials, such as sawdust, a long tube, means for directing compressed material discs one after the other on edge with one end of the tube and moving said discs along the latter, means in the tube for resisting the movement of the discs therethrough and creating a back pressure therein to compress said discs into a continuous log, means for directing large quantities of cooling air into the tube suddenly to cool the compressed material, and means for breaking off predetermined lengths from the log as the latter emerges from the tube.

7. In apparatus for forming logs of compressible materials, such as sawdust, a long tube having an entrance at one end and an outlet at its opposite end, the cross sectional area of the tube diminishing towards the outlet thereof, means for directing compressed material discs one after the other on edge into the tube entrance and moving said discs along the tube, said tube resisting the movement of the discs therethrough and creating a back pressure therein sufficient to compress the discs into a continuous log, and means for admitting large quantities of cooling air into the tube near the beginning thereof suddenly to cool the compressed material, said sudden cooling increasing the binding effect of the compressed material.

8. Log forming apparatus as claimed in claim 7 including means for breaking off predetermined lengths from the log as it emerges from the tube outlet.

9. Log forming apparatus as claimed in claim 7 including means for adjusting the diminishing of the cross sectional area of the tube.

10. Log forming apparatus as claimed in claim 7 including a plurality of spaced guides within and extending longitudinally of the tube, said guides being arranged around the axis of the tube, and the material discs fitting within the guides.

11. Log forming apparatus as claimed in claim 7 including a door section in the wall of the tube near the entrance thereof, and means normally retaining the door section closed, said means permitting the door to open when the back pressure in the tube reaches a predetermined point.

12. Log forming apparatus as claimed in claim 11 including a cage surrounding and spaced from the portion of the tube in which the door section is located.

13. In apparatus for forming logs of compressible materials, such as sawdust, a long tube having an entrance at one end and an outlet at its opposite end, said tube being formed in a plurality of sections, a plurality of spaced guides arranged around the axis of the tube and extending longitudinally the full length thereof, the cross sectional area within the guides diminishing towards the tube outlet, means for directing compressed material discs one after the other one edge into the guides in the tube entrance and moving said discs along the guides, said guides resisting the movement of the discs therethrough and creating a back pressure therein sufficient to compress the discs into a continuous log, and means for blowing large quantities of cooling air into the first section of the tube from the entrance of the latter into the space between the formed log and the tube.

14. Log forming apparatus as claimed in claim 13 in which the second section of the tube is formed with a plurality of slots extending longitudinally thereof.

15. Log forming apparatus as claimed in claim 13 in which the second section of the tube is formed in two longitudinal halves, said halves being spaced from each other to form slots extending longitudinally of the section, and including clamping means for adjustably retaining the halves of the section in tube form.

16. Log forming apparatus as claimed in claim 15 in which the third section of the tube comprises a cage in the form of a plurality of spaced rods extending longitudinally of the section secured to the inside of a plurality of spaced rings.

17. Log forming apparatus as claimed in claim 16 in which all the rings are in two halves thereby dividing the section into two longitudinal halves, and including means for adjustably retaining the halves of the section in tube form.

18. Log forming apparatus as claimed in claim 17 including a guillotine blade beyond the tube outlet normally spaced radially from the log emerging therefrom, means for moving the blade to strike the log, and means for operating the blade-moving means when a predetermined length of log has emerged from the tube.

19. In apparatus for forming logs of compressible materials, such as sawdust, a long tube having an entrance at one end and a discharge outlet at its opposite end, the bore of said tube tapering towards the discharge outlet, a tapered die at the tube entrance, a plunger for pressing predetermined quantities of compressible material into the die, means for reciprocating the plunger into and out of the die, said material being compressed by the plunger into a disc in the die, and said die being long enough to hold a plurality of discs which are moved one by one through the tube by the action of the plunger as it forms new discs in the die, and means near the tube entrance for directing large quantities of cooling air into said tube suddenly to cool the compressed material, said sudden cooling increasing the binding effect of the compressed material.

20. Apparatus for forming logs of sawdust comprising a tapered tubular die having a large entrance at one end and a small outlet at its opposite end, means feeding sawdust to the die entrance, a plunger arranged in line with the die to force the sawdust through the latter to compress said sawdust therein, means connected to the plunger to reciprocate the latter into and out of the die, a long tube connected to the die and having a bore aligned with the die, said tube having successive cooling and compression sections outwardly from the die, and means for directing cooling air into the cooling section of the tube suddenly to cool the compressed sawdust therein to increase the binding effect of the sawdust, said compression section following the cooling section with reference to the direction of movement of the sawdust and having a bore that diminishes slightly in cross sectional area in a direction away from said cooling section.

21. Log forming apparatus as claimed in claim 20 including means in the compression section of the tube for admitting air to the interior thereof throughout its length.

22. Log forming apparatus as claimed in claim 21 including a second compression section in the tube following the first compression section, said second compression section having a bore that diminishes in cross sectional area in the direction of movement of the sawdust and being slotted longitudinally thereof to admit more air to the interior thereof than is admitted to the first compression section.

23. Log forming apparatus as claimed in claim 22 including a plurality of spaced guides extending longitudinally of the tube sections arranged around the axis of the tube, said guides keeping the sawdust spaced from the tube wall as it moves through the sections.

References Cited in the file of this patent

UNITED STATES PATENTS

| | | |
|---|---|---|
| 275,866 | Smith | Apr. 17, 1883 |
| 502,558 | Gest et al. | Aug. 1, 1893 |
| 665,973 | Patterson | Jan. 15, 1901 |
| 949,176 | Foreman et al. | Feb. 15, 1910 |
| 1,528,224 | Naylor | Mar. 3, 1925 |
| 2,173,086 | Dinzl | Sept. 19, 1939 |
| 2,225,424 | Schwarzkopf | Dec. 17, 1940 |
| 2,596,872 | Skromme | May 13, 1952 |
| 2,622,510 | Letts | Dec. 23, 1952 |
| 2,678,600 | Allen | May 18, 1954 |